March 11, 1958  E. T. ABLE ET AL  2,826,431
TOWING DEVICES FOR HELICOPTERS
Filed May 21, 1956  2 Sheets-Sheet 1
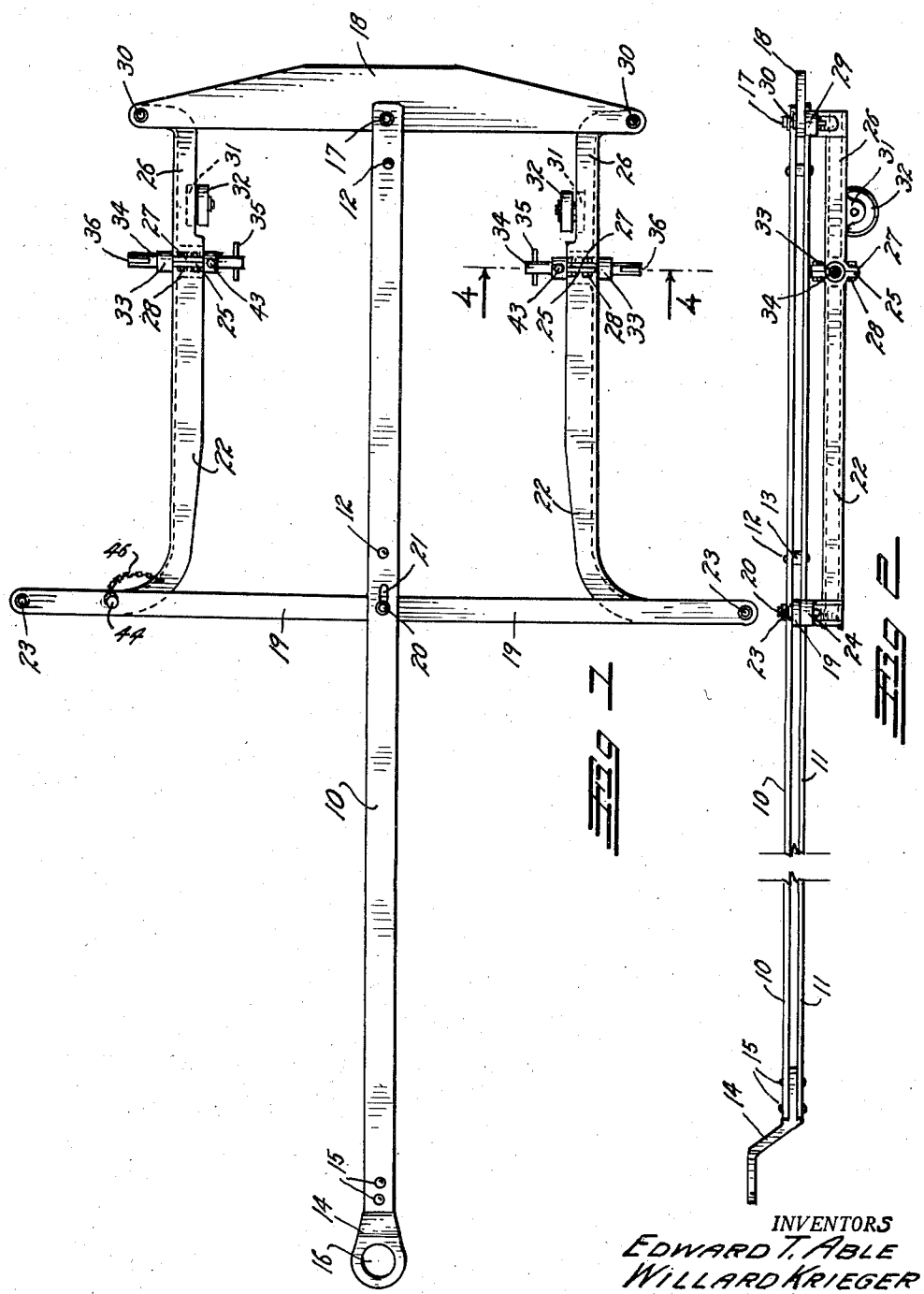
INVENTORS
EDWARD T. ABLE
WILLARD KRIEGER
JOHN DE RUITER
BY
Attorney

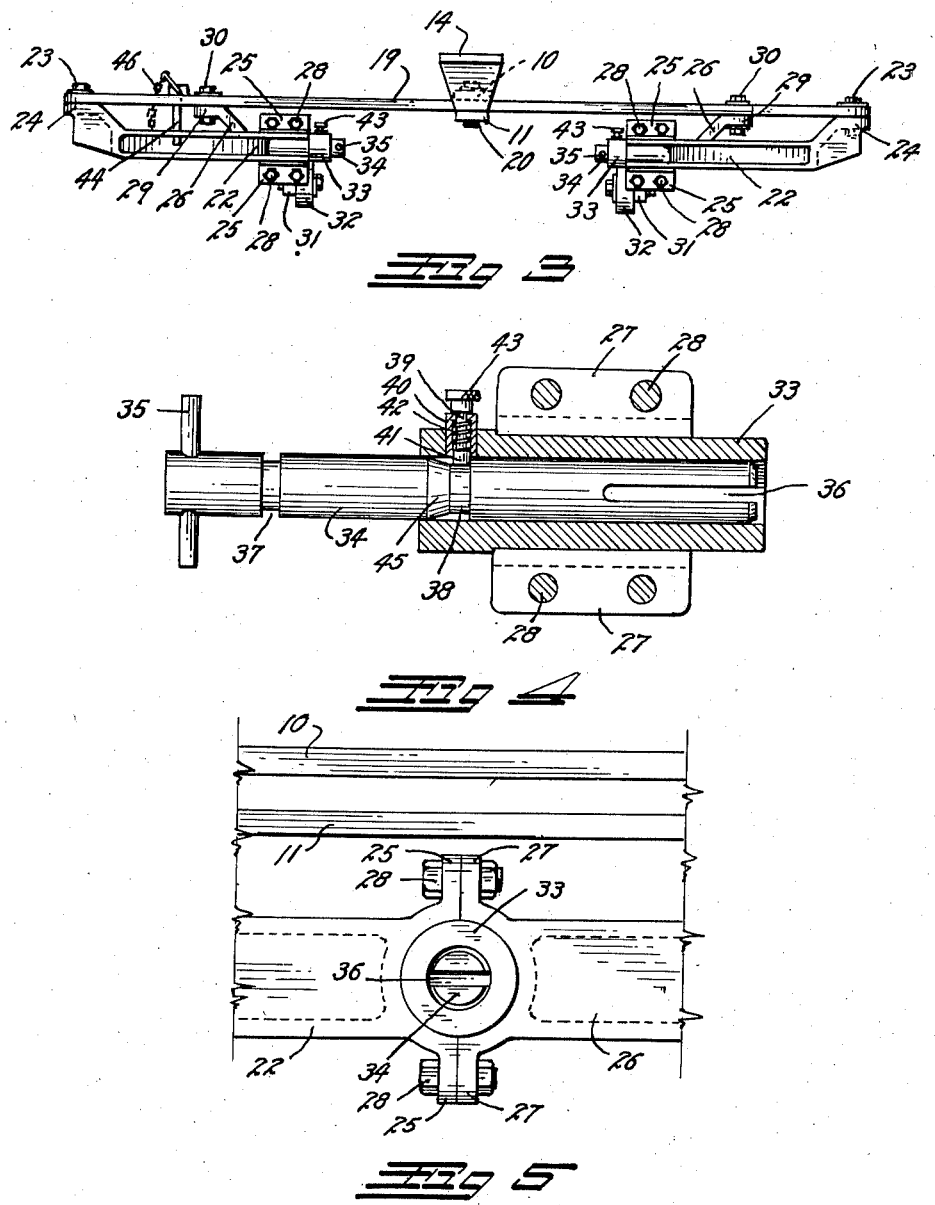

United States Patent Office 2,826,431
Patented Mar. 11, 1958

2,826,431

TOWING DEVICES FOR HELICOPTERS

Edward T. Able, Willard Krieger, and John De Ruiter, Denver, Colo., assignors to B. K. Sweeney Manufacturing Co., Denver, Colo., a corporation of Colorado Application May 21, 1956, Serial No. 586,154

6 Claims. (Cl. 280—474)

This invention relates to a towing device for helicopters. The usual helicopter is provided with two forward, spaced-apart, free caster wheels and a rear trailing wheel. Due to the swerving action of the freely castering front wheels, it is difficult to tow and guide a helicopter forwardly on the ground with a conventional tow bar or tow chain.

The principal object of this invention is to provide a towing device for helicopters which can be quickly and easily attached to the two caster wheels of the helicopter and to a towing vehicle, and which will act to accurately guide the helicopter in the path of the towing vehicle.

Another object of the invention is to provide a helicopter towing device which will differentially rotate the caster wheels when the helicopter is being towed in an arc so that each wheel will be positioned tangent to its arc of travel.

A further object of the invention is to so construct the improved helicopter towing device that it may be towed independently of the helicopter and so that it may be readily positioned between the caster wheels of the helicopter.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a plan view of the complete improved helicopter towing device;

Fig. 2 is a partially broken away side view thereof;

Fig. 3 is a front view thereof;

Fig. 4 is an enlarged detailed cross-section, taken on line 4—4, Fig. 1, illustrating the mechanism employed for attaching the towing device to the caster wheels of a helicopter; and Fig. 5 is a similarly enlarged side view of the improved towing device, illustrating the attachment means of Fig. 4.

The improved towing device is designed more particularly for use on helicopters of the type having two spaced-apart forwardly positioned caster wheels mounted on hollow axles. In such craft, the hollow wheel axles contain diametrically-extending cross key pins which the present invention is designed to accommodate as will be later described.

The device comprises an elongated upper tongue bar 10 and a similar elongated lower tongue bar 11 secured together in vertically spaced relation as a unit by means of suitable rivets 12 and spacing sleeves 13. The forward extremities of the tongue bars 10 and 11 are rigidly attached to a towing hitch member 14 by means of suitable rivets 15, or in any other desired manner. The towing hitch member 14 is provided with an opening 16 for attachment to any conventional vehicular tow bar hitch. The rear extremities of the tongue bars 10 and 11 extend above and below an oscillatable rear cross bar 18 and are pivotally secured to the middle of the cross bar 18 by means of a suitable pivot pin 17.

A front cross bar 19 extends between the upper and lower tongue bars 10 and 11 and is pivotally mounted therebetween, and at the middle of the cross bar 19, on a second pivot pin 20. The pin 20 extends through the front cross bar 19 and through slotted pivot openings 21 in both the tongue bars 10 and 11.

An L-shaped, forward side member 22 is pivotally attached by means of a suitable pivot pin 23 below each extremity of the front cross bar 19. The forward side members 22 are preferably channel-shaped in cross-section, having the open sides of the channels facing inwardly toward each other. The forward portion of each forward side member 22 is turned outwardly at an angle to substantially 90° thence upwardly to form a terminal pad 24 through which the pivot pins 23 extend. The major lengths of the forward side members 22 lie normally in parallel relation to the axis of the tongue bars 10 and 11. The forward side members 22 terminate at their rear extremities in terminal bolt flanges 25.

A rear side member 26 is positioned rearwardly of and in alignment with each of the front side members 22. The forward extremities of the rear side members are formed with bolt flanges 27 which are bolted to the flanges 25 of the forward side members by means of suitable flange bolts 28. The rear side members 26 are also channel-shaped in cross-section and are positioned with the sides of the channels facing inwardly. The rear extremities of the rear side members 26 extend laterally outward, at an angle of substantially 90°, and thence upward to form terminal pads 29. Each terminal pad 29 is pivotally secured beneath an extremity of the rear cross bar 18 upon a suitable pivot pin 30. The outwardly extending forward portions of the forward side members 22 exceed in length the outwardly extending rear extremities of the rear side members 26, that is, the distance between the two pivot pins 23 exceeds the distance between the two pivot pins 30 by a predetermined distance. This, of course, results in the length of the forward cross bar 19 exceeding the length of the rear cross bar 18. The rear cross bar 18 is sufficiently short to allow it to pass between the forward caster wheels of a conventional helicopter while the forward cross bar 19 extends outwardly beyond the track of said wheels.

The rear side members 26 are formed with downwardly projecting wheel ears 31 upon each of which a ground-engaging wheel 32 is rotatably mounted.

A semi-cylindrical, horizontally positioned socket is formed in each of the joined extremities of the side members 22 and 26 which, when the members are bolted together, are clamped about an axle pin sleeve 33. An axle pin 34 is rotatably and slidably mounted in each of the sleeves 33. The inner extremity of each axle pin 34 is provided with a suitable T-handle 35, and the outer extremity of each axle pin is provided with a diametrically extending key slot 36.

Each axle pin 34 is formed with an annular locking groove 37 adjacent its T-handle 35 and with a second locking groove 38 adjacent its middle. The latter groove is formed with an inclined side wall 45 directed toward the T-handle 35. A latch plunger 39 extends through a latch bushing 40, radially positioned in the side of each sleeve 33, and terminates in a groove-engaging head 41. Each groove-engaging head 41 is urged into engagement with either desired one of the grooves 37 or 38 by means of a suitable latch spring 42. A finger engagement knob 43 is mounted on the outer extremity of each latch plunger 39.

When not in use, the entire device can be locked in the normal rectangular position of Fig. 1 by means of a removable locking pin 44 which can be extended through a pin opening in the forward cross bar 19 and into a receiving pin opening in the forward side member 22 therebelow. When not in use for towing purposes, the entire device is freely portable on the wheels 32 with the locking pin 44 acting to maintain the wheels in parallel relation. To prevent loss, the locking pin is preferably provided with an anchor chain 46.

In use, the improved towing device is backed between the wheels of a helicopter. One side of the device is lifted until the pin sleeve 33 at that side is positioned opposite the hollow axle of a wheel. The axle pin 34 at that side is then pressed forwardly to engage in the hollow axle. The other side of the device is then lifted and the axle pin 34 at that side is forced outwardly into the hollow wheel axle until the plunger head 41 snaps into the locking groove 37 of the axle pin to lock the latter in the projected position. The opposite axle pin 34 is now similarly forced outwardly into the first wheel axle until its plunger head 41 engages the locking groove 37 therein.

The key pin slots 36 in the axle pins 34 allow the latter to pass the key pins with which such hollow axles are usually provided. The T-handles 35 provide means for rotating the axle pins 34 within the hollow axles to properly position the slots 36 to pass the key pins therein. The inclined side walls 45 on the grooves 38 allow the axle pins to be forced into the axles without necessity for withdrawing the latch plungers 39.

The entire device is now supported by the helicopter wheels and the latter are under full control of the improved towing device. The locking pin 44 is now removed and the device is ready for towing the helicopter along any desired path. It can be seen that if towed straight forwardly, the helicopter wheels will be maintained in a straight forward parallel position by the rigid axle pins 34. If the towing vehicle turns to the right, the turning movement will be transmitted to the side members 22 and 26 through the cross bars 18 and 19, the forward bar 19 moving in the direction of the turn, and the rear bar 18 moving in the opposite direction. However, due to the difference in distance between the pivot pins 23 and the pivot pins 30 the side members on the inside of the turn will move to a greater angle to the axis of the tongue bars than the side members on the outside of a turn so as to position the planes of the two helicopter wheels tangent to the circles about which they are traveling. Therefore, all dragging of the wheel tires is eliminated and the wheels travel on perfect tangents to all arcuate turns while being towed.

The improved tow bar is released from the helicopter by simply lifting the latch plungers 39 to release the heads 41 from the locking grooves 37, after which the axle pins 34 can be withdrawn from the hollow wheel axles, allowing the towing device to drop upon its wheels 32 so that it may be towed from beneath the helicopter.

Due to the difference in spacing between the pivot pins 23 and the pivot pins 30, it is necessary to allow the cross bars 18 and 19 to move toward and away from each other when making turns. This is accomplished by the slotted pivot openings 21 which allow the pivot pin 20 to move longitudinally of the tongue bars 10 and 11.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A towing device comprising: an elongated tongue member; means for securing the forward extremity of said tongue member to a towing vehicle; a rear cross bar pivoted at its middle to the rear extremity of said tongue member so as to swing in the plane of the latter; a front cross bar of greater length than said rear cross bar similarly pivoted at its middle to said tongue member forwardly of said rear cross bar; a side frame member positioned at each side of said tongue member between said rear and front cross bars; a relatively long, outwardly turned forward extremity on each side member; means hinging the outwardly turned forward extremity of each side member to and below an extremity of said forward cross member; means hingedly securing the rear extremities of said side members to and below the extremities of said rear cross member; an axle pin sleeve horizontally and transversely mounted in each side frame member; and an axle-engaging pin slidably mounted in each axle pin sleeve and adapted to be projected outwardly therefrom into a hollow axle of a wheel on a vehicle to be towed.

2. A towing device as described in claim 1 having means for locking said axle-engaging pins in the projected and in the retracted positions.

3. A towing device as described in claim 2 having means for locking one of said cross bars to one of said side frame members to maintain the latter in parallel relation to said tongue member when desired.

4. A towing device as described in claim 3 having outwardly turned rear extremities on said side members extending to the hinged connections with said rear cross bar.

5. A towing device as described in claim 4 in which each side member comprises a forward side member and a rear side member bolted together at their adjacent extremities, said axle pin sleeves being clamped between the forward and rear side members at each side of said device.

6. A towing device as described in claim 5 having means for allowing the pivot between said forward cross bar and said tongue member to move longitudinally of the latter.

References Cited in the file of this patent

UNITED STATES PATENTS

| | | |
|---|---|---|
| 970,244 | Lauterbur | Sept. 13, 1910 |
| 1,155,437 | Peterson | Oct. 5, 1915 |
| 1,498,116 | Parcel | June 17, 1924 |
| 2,287,955 | Zunino | June 30, 1942 |
| 2,340,273 | Phillips | Jan. 25, 1944 |
| 2,692,149 | Wilcox | Oct. 19, 1954 |